US009122973B2

(12) United States Patent
Sugita

(10) Patent No.: US 9,122,973 B2
(45) Date of Patent: Sep. 1, 2015

(54) DATA TRANSMISSION APPARATUS, METHOD FOR CONTROLLING DATA TRANSMISSION APPARATUS, AND STORAGE MEDIUM

(71) Applicant: CANON KABUSHIKI KAISHA, Tokyo (JP)

(72) Inventor: Hikaru Sugita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/078,177

(22) Filed: Nov. 12, 2013

(65) Prior Publication Data

US 2014/0146357 A1 May 29, 2014

(30) Foreign Application Priority Data

Nov. 29, 2012 (JP) ................................. 2012-260530

(51) Int. Cl.
| | |
|---|---|
| G06F 3/12 | (2006.01) |
| G08C 17/00 | (2006.01) |
| H04L 12/28 | (2006.01) |
| H04J 3/24 | (2006.01) |
| H04B 1/16 | (2006.01) |
| H04B 7/00 | (2006.01) |
| H04B 1/38 | (2006.01) |
| G06K 15/02 | (2006.01) |
| G06K 15/00 | (2006.01) |

(52) U.S. Cl.
CPC .......... *G06K 15/1805* (2013.01); *G06F 3/1221* (2013.01); *G06F 3/1236* (2013.01); *G06F 3/1292* (2013.01); *G06K 15/406* (2013.01); *Y02B 60/1271* (2013.01)

(58) Field of Classification Search
None
See application file for complete search history.

(56) References Cited

U.S. PATENT DOCUMENTS

| | | | | |
|---|---|---|---|---|
| 6,937,353 | B2* | 8/2005 | Iizuka et al. | 358/1.13 |
| 7,113,295 | B2* | 9/2006 | Kadowaki | 358/1.14 |
| 7,583,394 | B2* | 9/2009 | Kadowaki | 358/1.13 |
| 7,826,457 | B2* | 11/2010 | Bennett et al. | 370/394 |
| 7,979,097 | B2* | 7/2011 | Hussain | 455/574 |
| 7,983,651 | B2* | 7/2011 | Minematsu et al. | 455/343.2 |
| 8,320,288 | B2* | 11/2012 | Sakoda | 370/311 |
| 8,437,810 | B2* | 5/2013 | Hussain | 455/574 |
| 8,804,741 | B2* | 8/2014 | Bennett et al. | 370/394 |
| 8,964,612 | B2* | 2/2015 | Moritomo | 370/311 |
| 2002/0140963 | A1* | 10/2002 | Otsuka | 358/1.14 |
| 2011/0134465 | A1* | 6/2011 | Gha | 358/1.15 |
| 2011/0292446 | A1* | 12/2011 | Kojima | 358/1.15 |
| 2012/0062950 | A1* | 3/2012 | Lee | 358/1.15 |
| 2012/0236350 | A1* | 9/2012 | Otsuka | 358/1.13 |
| 2012/0257247 | A1* | 10/2012 | Yamasaki | 358/1.15 |
| 2012/0274973 | A1* | 11/2012 | Nishikawa | 358/1.14 |
| 2013/0057883 | A1* | 3/2013 | Ohshima et al. | 358/1.9 |
| 2013/0322314 | A1* | 12/2013 | Yamaki | 370/311 |
| 2014/0146335 | A1* | 5/2014 | Sugita | 358/1.13 |
| 2014/0146336 | A1* | 5/2014 | Yagi | 358/1.13 |

FOREIGN PATENT DOCUMENTS

| | | |
|---|---|---|
| JP | 2002-300175 A | 10/2002 |
| JP | 2009-071385 A | 4/2009 |

* cited by examiner

*Primary Examiner* — Satwant Singh
(74) *Attorney, Agent, or Firm* — Canon U.S.A., Inc. IP Division

(57) ABSTRACT

When a print screen for transmitting a print job to a printing apparatus is displayed, an information processing apparatus transmits a disable command of disabling a power saving mode to the printing apparatus. The printing apparatus receiving the disable command temporarily disables the power saving mode.

10 Claims, 13 Drawing Sheets

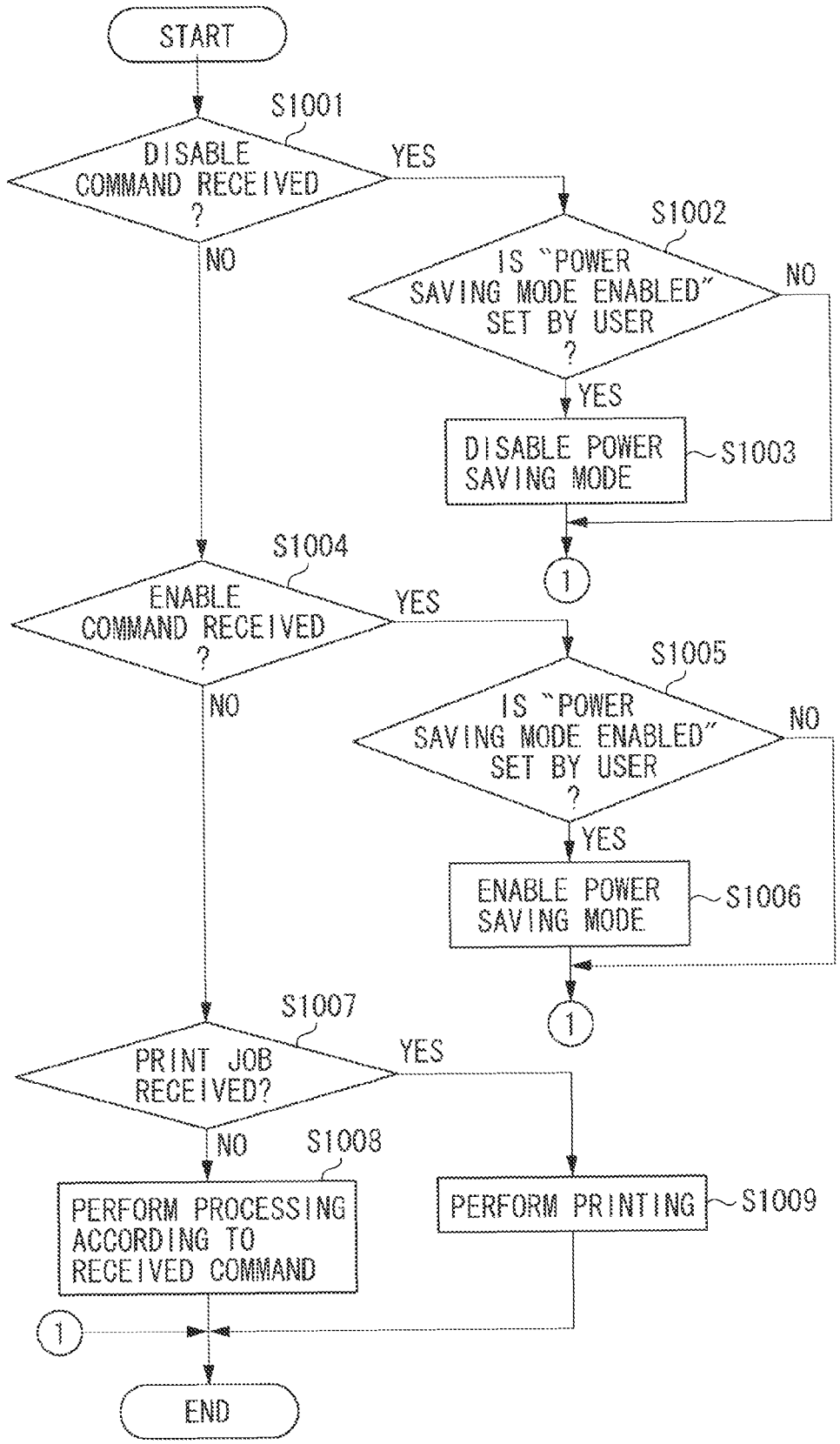

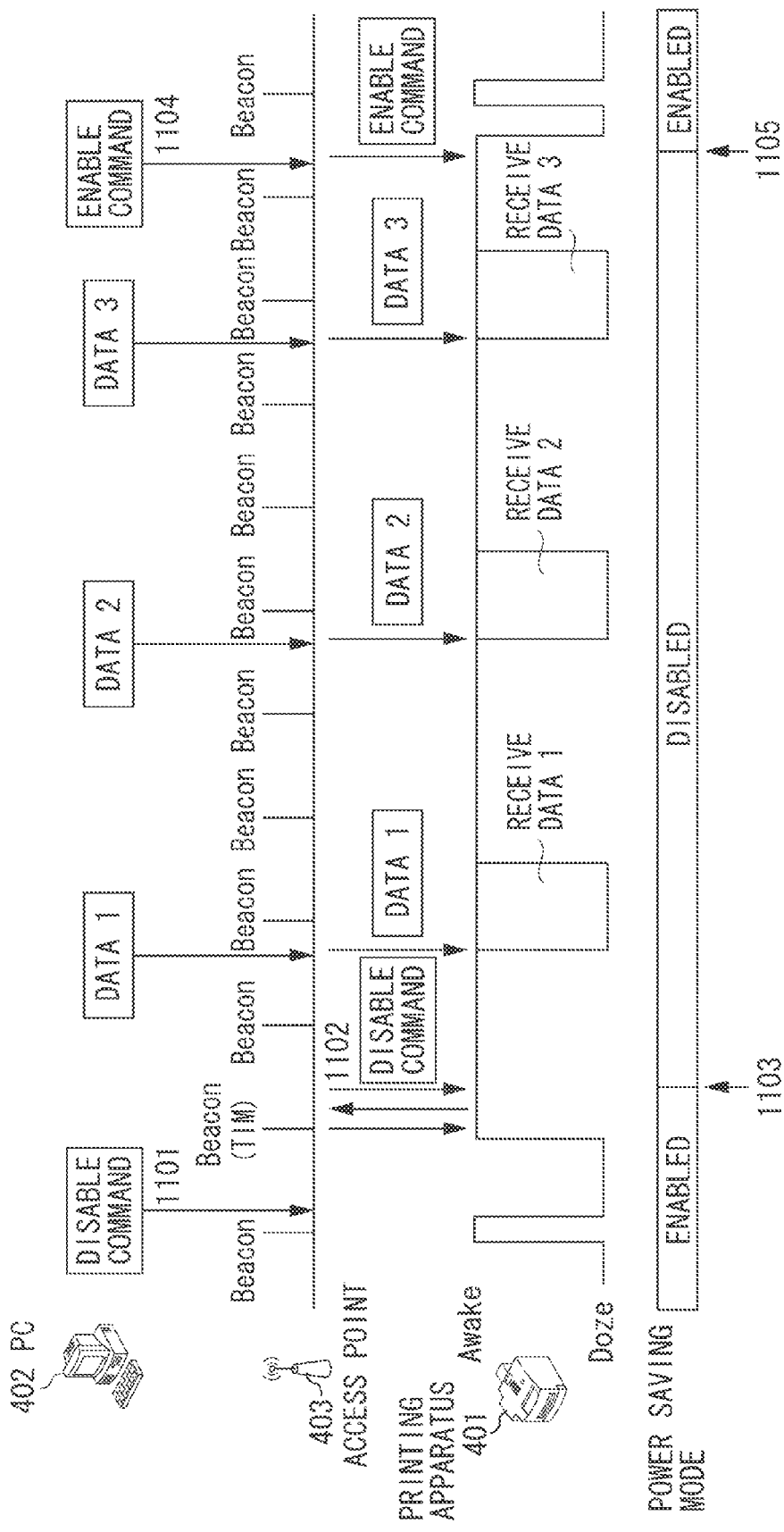

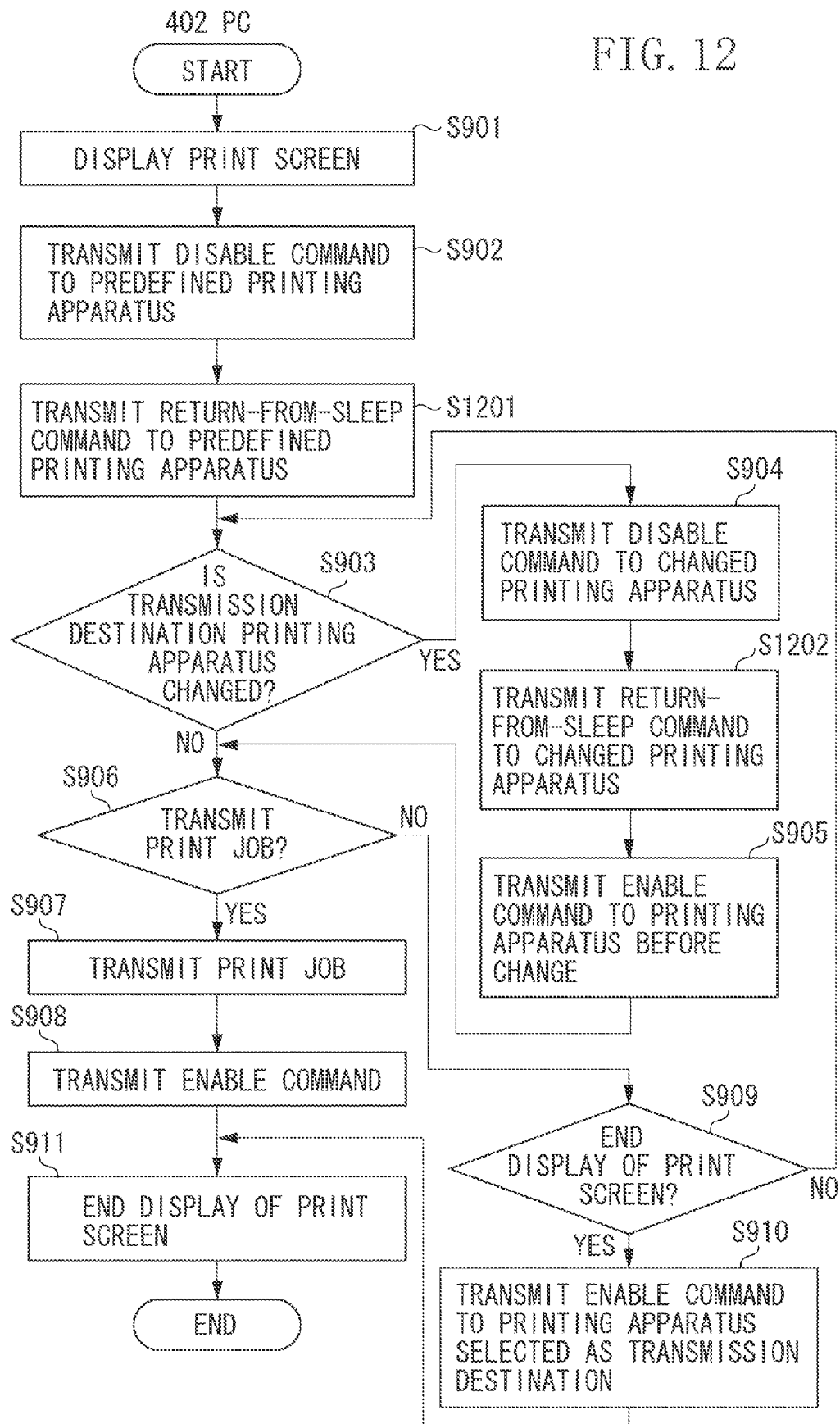

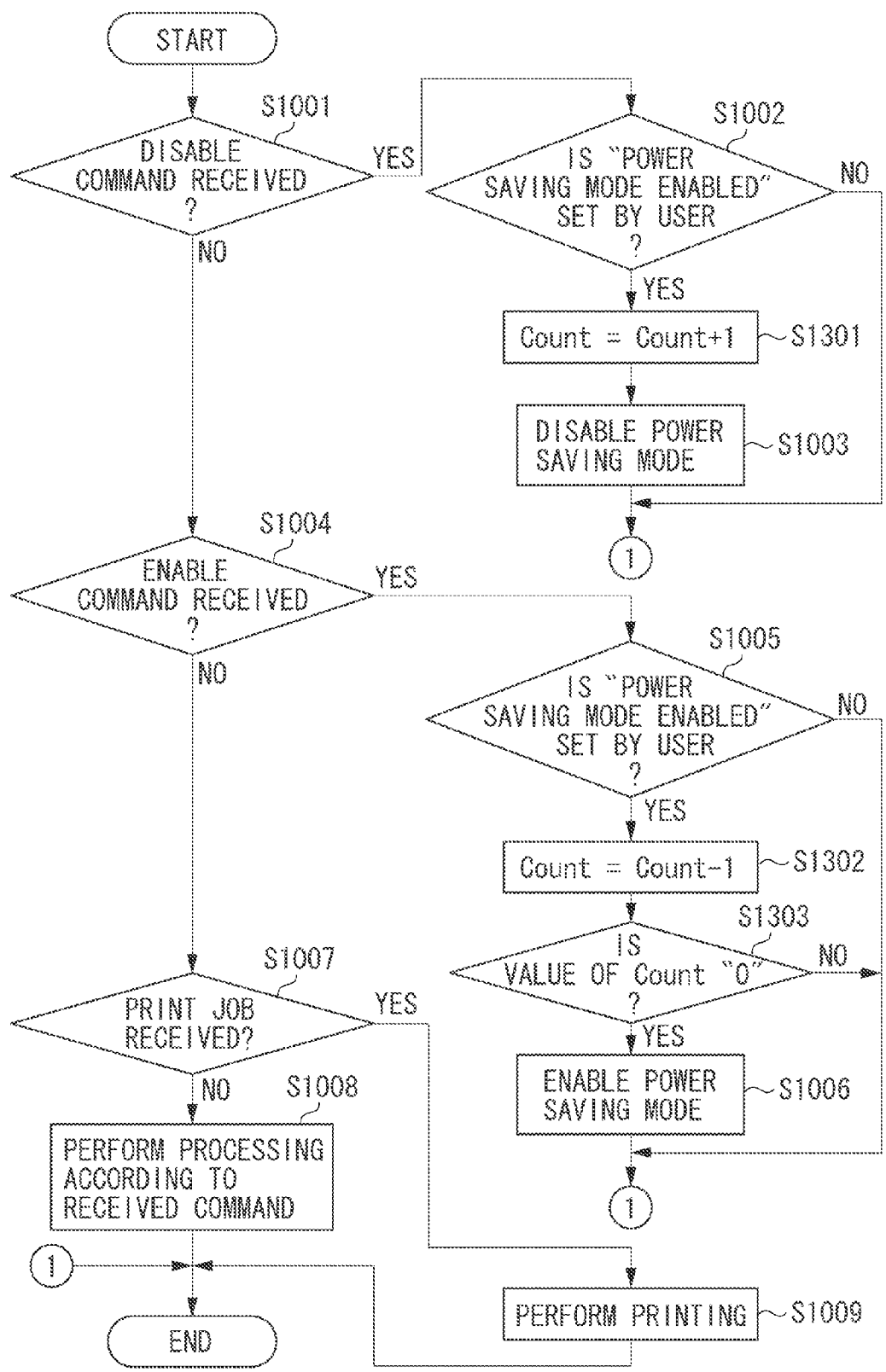

DATA TRANSMISSION APPARATUS, METHOD FOR CONTROLLING DATA TRANSMISSION APPARATUS, AND STORAGE MEDIUM

BACKGROUND OF THE INVENTION

1. Field of the Invention

The present invention relates to a data transmission apparatus capable of making wireless communication, a method for controlling the data transmission apparatus, and a storage medium.

2. Description of the Related Art

In recent years, many devices with a wireless local area network (LAN) conforming to the IEEE802.11 standard have been produced. As a technique for reducing power consumption of a wireless communication unit for making wireless communication, there is known a power saving mode of a wireless LAN discussed in Japanese Patent Application Laid-Open No. 2002-300175. The power saving mode will be described with reference to FIGS. 1, 2, and 3.

FIG. 1 illustrates processing performed when the power saving mode is disabled. FIG. 1 illustrates a printing apparatus as an example of a device with a wireless LAN. When the power saving mode is disabled in the printing apparatus, a wireless communication unit of the printing apparatus is always in an Awake state, or in a power-supplied state. When the wireless communication unit is in the Awake state, the printing apparatus can transmit data to an external device or receive data transmitted from an external device by use of wireless communication.

When an access point receives data addressed to the printing apparatus from an information processing apparatus such as a personal computer (PC) (101), the access point transmits the data to the printing apparatus (102). The access point transmits a signal called beacon at constant intervals to a peripheral device, and the data transmission illustrated at 102 of FIG. 1 is performed irrespective of the beacon intervals.

Processing performed when the power saving mode is enabled will be described below with reference to FIG. 2. When the power saving mode is enabled, the wireless communication unit repeats a transition between the Awake state and a Doze state. The Doze state is a state in which power supplying to the wireless communication unit is blocked or reduced, and when the wireless communication unit is in the Doze state, the printing apparatus cannot transmit data to an external device or receive data transmitted from an external device by use of wireless communication.

When the power saving mode is enabled, the wireless communication unit intermittently transitions from the Doze state to the Awake state in synchronization with the beacon intervals of the access point (201 to 203). The access point which receives data (data addressed to the printing apparatus) transmitted from the information processing apparatus uses information such as Traffic Indication Message (TIM) or Delivery Traffic Indication Message (DTIM) to notify, to the printing apparatus, that the data addressed to the printing apparatus is present (204, 205). TIM is directed for notifying, to the printing apparatus, that data addressed to the printing apparatus is present. DTIM is a type of TIM, and indicates that data to be transmitted is for multicast or broadcast.

The printing apparatus which transitions to the Awake state at timing 206 in FIG. 2 receives TIM notified at timing 205. The printing apparatus requests the access point to transmit the data (207). The access point which receives the request at timing 207 transmits data 1 to the printing apparatus (208).

When the power saving mode is enabled, the wireless communication unit transitions from the Awake state to the Doze state under a condition that data is not transmitted nor received between the printing apparatus and the access point in the Awake state for a predetermined time (half the beacon interval, for example). In FIG. 2, when a predetermined time 209 elapses after the printing apparatus receives the data 1, the wireless communication unit transitions from the Awake state to the Doze state (210). After transitioning to the Doze sate, the wireless communication unit intermittently transitions from the Doze state to the Awake state in synchronization with the beacon intervals of the access point similarly as at 201 to 203. The condition that the wireless communication unit transitions from the Awake state to the Doze state is not limited to an elapse of the predetermined time 209. The wireless communication unit may transition from the Awake state to the Doze state under a condition that no accumulation of data addressed to the printing apparatus is confirmed by the beacon.

The power saving mode of the wireless LAN is enabled thereby to reduce power consumption of the wireless communication unit. However, when the power saving mode of the wireless LAN is enabled, a communication delay easily occurs when the printing apparatus receives data (such as print job) transmitted from the access point. The reason why a delay easily occurs will be described with reference to FIG. 3.

When the information processing apparatus transmits a large amount of data (large-size data) to the printing apparatus via the access point, the large amount of data is divided to be transmitted. FIG. 3 illustrates an example in which a large amount of data is divided into data 1, data 2, and data 3 to be transmitted. The access point receives the data 1 transmitted from the information processing apparatus at 301. When the power saving mode is disabled, the access point can immediately start to transmit the data 1 to the printing apparatus, but the power saving mode is enabled, and thus the access point waits until a next beacon timing and then transmits the data 1 to the printing apparatus. That is, a communication delay with time 302 occurs unlike when the power saving mode is disabled.

The wireless communication unit of the printing apparatus which has completely received the data 1 transitions from the Awake state to the Doze state at timing 303 if data is not transmitted nor received for a predetermined time. If a timing when the access point receives the data 2 from the information processing apparatus is later than 303 as illustrated in FIG. 3, the access point waits until a next beacon timing and then transmits the data 2 to the printing apparatus. That is, a communication delay with time 304 occurs also when the access point transmits the data 2 to the printing apparatus. A communication delay with time 305 similarly occurs also when the access point transmits the data 3 to the printing apparatus.

FIG. 3 illustrates the example in which a large amount of data is divided into three items of data, but the number of items of divided data to be actually transmitted is enormous, and thus a communication delay is more conspicuous. As a technique for solving the issue, Japanese Patent Application Laid-Open No. 2009-071385 discusses therein a communication terminal device for disabling a power saving mode of a wireless LAN on receiving streaming data such as moving images or sounds. The communication terminal device discussed in Japanese Patent Application Laid-Open No. 2009-071385 disables the power saving mode of the wireless LAN on receiving streaming data such as moving images or sounds, thereby preventing a communication delay with 304 or 305 of FIG. 3 from occurring.

The communication terminal device discussed in Japanese Patent Application Laid-Open No. 2009-071385 can prevent a communication delay from occurring on receiving streaming data such as moving images or sounds in the power saving mode of the wireless LAN. However, the communication terminal device discussed in Japanese Patent Application Laid-Open No. 2009-071385 needs to be provided with a special structure of determining whether received data is streaming data, and if the data is streaming data, disabling the power saving mode. The communication terminal device discussed in Japanese Patent Application Laid-Open No. 2009-071385 cannot disable the power saving mode if the received data is not streaming data such as moving images or sounds, even if a communication delay easily occurs in the received data.

SUMMARY OF THE INVENTION

The present invention is directed to transmitting a command of disabling a power saving mode from an information processing apparatus as a data transmission side to an external device, thereby disabling a power saving mode of the external device as a data reception side.

According to an aspect of the present invention, a data transmission apparatus capable of making wireless communication with a data reception device including a wireless communication unit includes a first transmission unit configured to, when the data transmission apparatus displays thereon a specific screen for transmitting data to the data reception device, transmit a disable instruction of disabling a power saving mode of the wireless communication unit to the data reception device, and a second transmission unit configured to transmit data to the data reception device in response to a user's instruction after the first transmission unit transmits the disable instruction to the data reception device.

Further features of the present invention will become apparent from the following description of exemplary embodiments with reference to the attached drawings.

BRIEF DESCRIPTION OF THE DRAWINGS

FIG. 10 is a flowchart illustrating processing performed when the printing apparatus receives data according to the first exemplary embodiment.

FIG. 11 is a diagram illustrating switching between enable and disable of the power saving mode according to the first exemplary embodiment.

FIG. 12 is a flowchart illustrating processing performed when a print screen is displayed according to a second exemplary embodiment.

FIG. 13 is a flowchart illustrating processing performed when the printing apparatus receives data according to a third exemplary embodiment.

DESCRIPTION OF THE EMBODIMENTS

Various exemplary embodiments, features, and aspects of the invention will be described in detail below with reference to the drawings.

The following exemplary embodiments do not intend to limit the present invention within the scope of claims, and all the combinations of characteristics described in the exemplary embodiments are not necessarily essential for solving the issues of the present invention.

Figure 4:
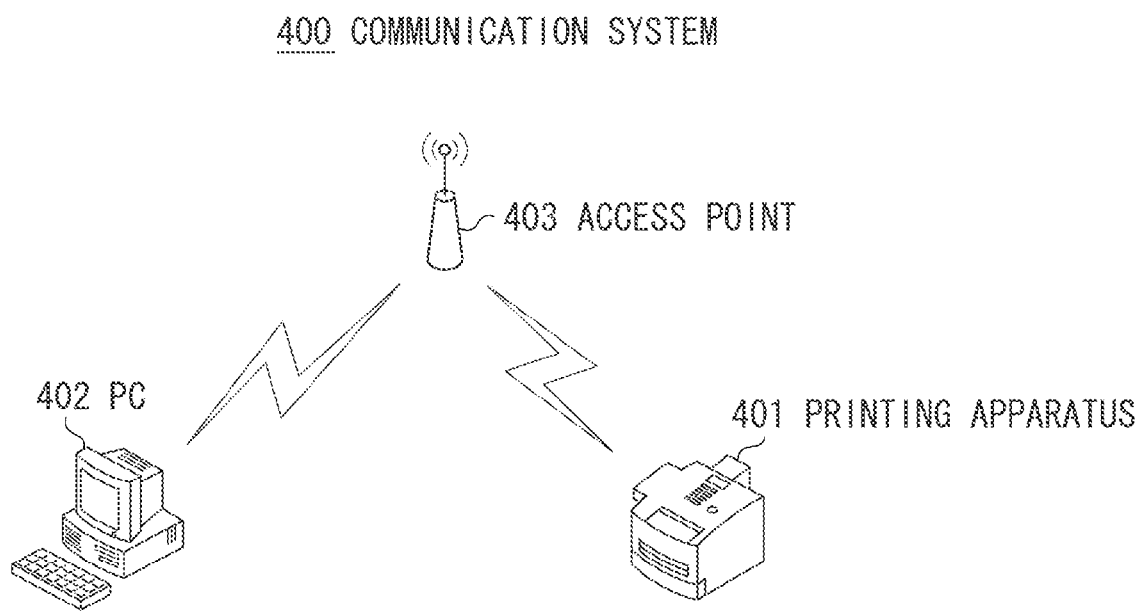
FIG. 4 is a diagram illustrating a communication system according to a first exemplary embodiment.

A structure of a communication system 400 according to a first exemplary embodiment will be described with reference to FIG. 4. The communication system 400 includes a printing apparatus 401, a PC 402, and an access point 403. The printing apparatus 401 and the PC 402 can make wireless communication via the access point 403.

Figure 5:
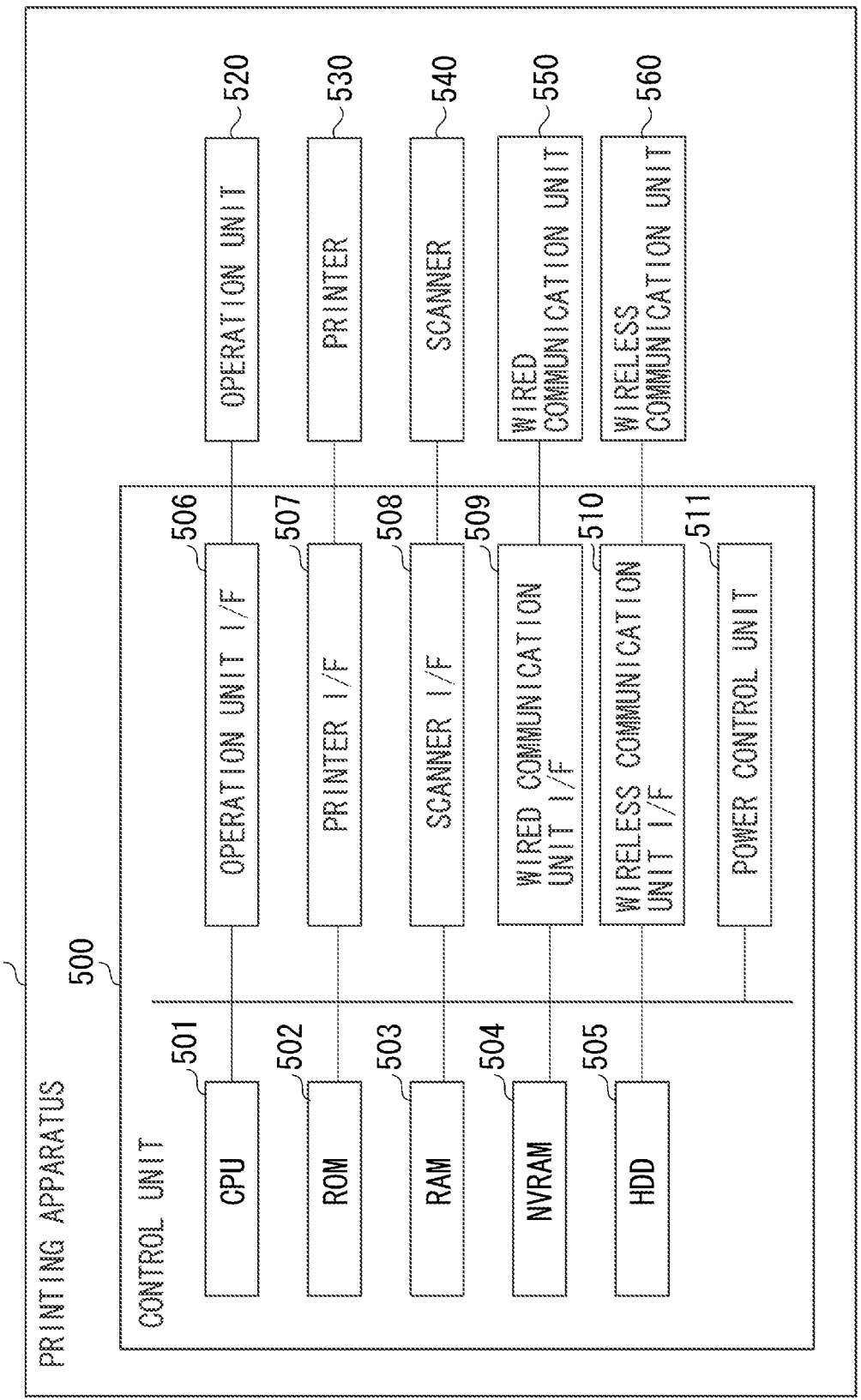
FIG. 5 is a diagram illustrating a hardware structure of a printing apparatus.

A hardware structure of the printing apparatus 401 will be described below with reference to FIG. 5. The printing apparatus 401 is a multifunction peripheral having a copy function, a print function, a scan function, a transmission function, and the like. The present exemplary embodiment will be described using a multifunction peripheral as an example, but the printing apparatus 401 is not limited to a multifunction peripheral. The printing apparatus 401 does not need to have all the above functions, and may be a printer having only the printer function. Alternatively, the printing apparatus 401 may have other functions.

The printing apparatus 401 includes a control unit 500, an operation unit 520, a printer 530, a scanner 540, a wired communication unit 550, and a wireless communication unit 560.

A central processing unit (CPU) 501 of the control unit 500 reads a control program stored in a read only memory (ROM) 502 to control the entire operations of the printing apparatus 401. A random access memory (RAM) 503 is used as a temporary storage area such as main memory or work area for the CPU 501. A nonvolatile random access memory (NVRAM) 504 is a nonvolatile memory and stores various items of information therein. A hard disk drive (HDD) 505 is used as a storage area for storing font data, emulation program and form data therein.

One CPU 501 in the printing apparatus 401 uses one memory (the RAM 503 or the HDD 505) to perform each processing illustrated in a flowchart described below, but may employ other form. For example, a plurality of CPUs or a plurality of RAMs or HDDs may cooperate thereby to perform each processing illustrated in the flowchart described below.

An operation unit interface (I/F) 506 connects the operation unit 520 and the control unit 500. The control unit 500 and the operation unit 520 exchange data via the operation unit I/F 506. The operation unit 520 is provided with a liquid crystal display unit having a touch panel function, a keyboard, or the like. A user can input an instruction into the printing apparatus 401 via the operation unit 520.

A printer I/F 507 connects the printer 530 and the control unit 500. The control unit 500 and the printer 530 exchange data via the printer I/F 507. The printer 530 performs print processing based on a print job received from the PC 402 or image data generated by the scanner 540.

A scanner I/F 508 connects the scanner 540 and the control unit 500. The control unit 500 and the scanner 540 exchange data via the scanner I/F 508. The scanner 540 reads an original thereby to generate image data.

A wired communication unit I/F 509 connects the wired communication unit 550 and the control unit 500. The control unit 500 and the wired communication unit 550 exchange data via the wired communication unit I/F 509. The wired communication unit 550 is connected with a LAN cable (not illustrated) thereby to communicate with an external device on a network.

A wireless communication unit I/F 510 connects the wireless communication unit 560 and the control unit 500. The control unit 500 and the wireless communication unit 560 exchange data via the wireless communication unit I/F 510. The wireless communication unit 560 can make wireless communication with an external device on a network via the access point 403.

A power control unit 511 controls power supplying from a power supply (not illustrated) to the respective units (the control unit 500, the operation unit 520, the printer 530, the scanner 540, the wired communication unit 550, and the wireless communication unit 560) of the printing apparatus 401.

The wireless communication unit 560 of the printing apparatus 401 according to the present exemplary embodiment has a power saving mode. When the power saving mode is disabled, the wireless communication unit 560 is always in an Awake state or a state in which power is being supplied from the power control unit 511. When the wireless communication unit 560 is in the Awake state, the printing apparatus 401 can transmit data to an external device or receive data transmitted from an external device by use of wireless communication.

On the other hand, when the power saving mode is enabled, the wireless communication unit 560 repeats a transition between the Awake state and a Doze state. The Doze state is a state in which power supplying from the power control unit 511 to the wireless communication unit 560 is blocked or reduced. When the wireless communication unit 560 is in the Doze state, the printing apparatus 401 cannot transmit data to an external device or receive data transmitted from an external device by use of wireless communication.

When the power saving mode is enabled, the wireless communication unit 560 of the printing apparatus 401 transitions from the Doze state to the Awake state in synchronization with the beacon intervals of the access point 403. Power consumption of the wireless communication unit 560 of the printing apparatus 401 can be further reduced when the power saving mode is enabled than when the power saving mode is disabled.

Figure 6:
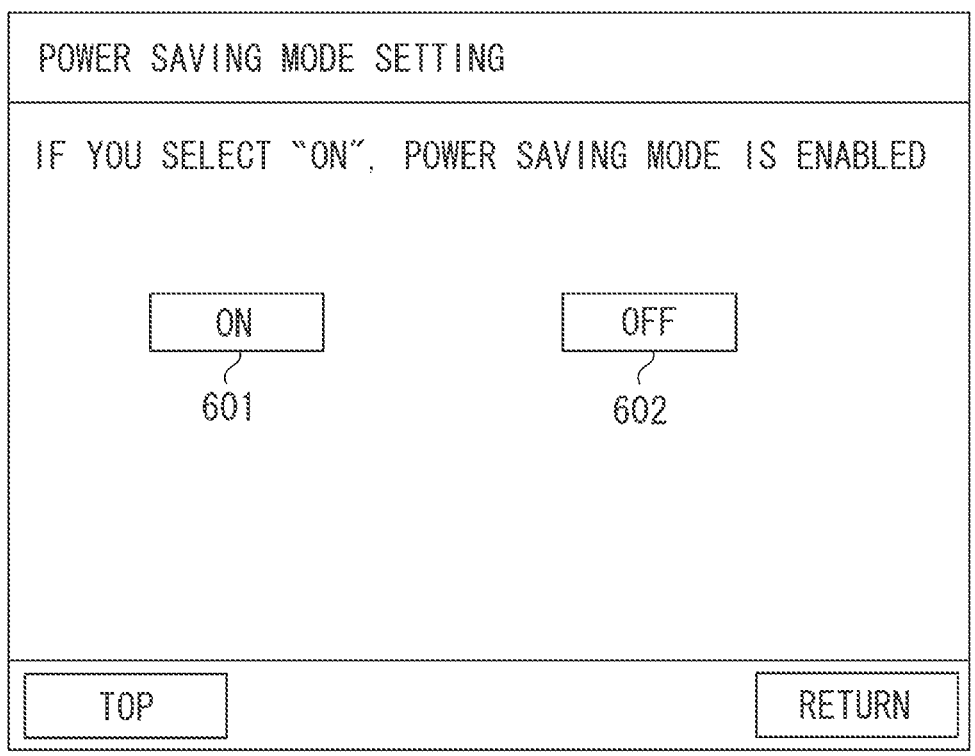
FIG. 6 is a diagram illustrating a setting screen for setting a power saving mode.

According to the present exemplary embodiment, the user can designate whether to enable or disable the power saving mode. A power saving mode setting screen 600 of FIG. 6 is displayed on the operation unit 520 of the printing apparatus 401. When the user selects an ON button 601 on the power saving mode setting screen 600, the power saving mode is enabled. On the other hand, when the user selects an OFF button 602 on the power saving mode setting screen, the power saving mode is disabled.

Figure 7:
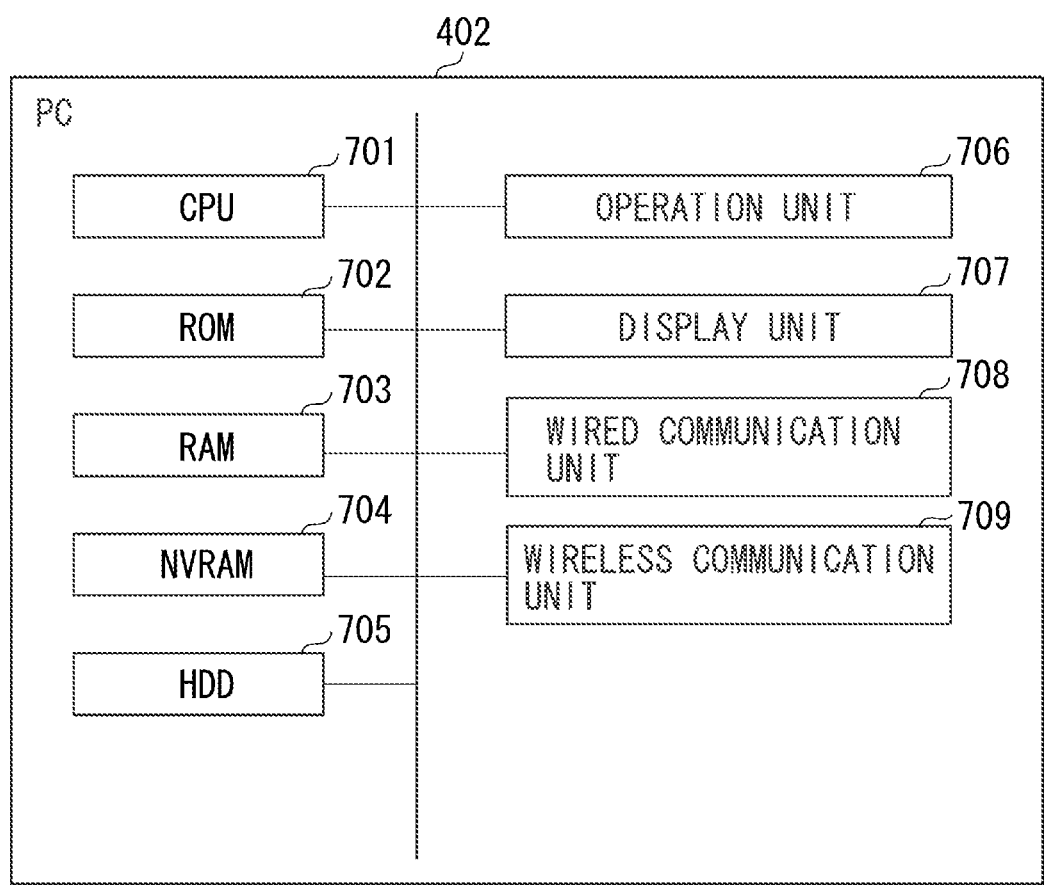
FIG. 7 is a diagram illustrating a hardware structure of a PC.

A hardware structure of the PC 402 will be described below with reference to FIG. 7. The PC 402 is an information processing apparatus for transmitting a print job to the printing apparatus 401.

A CPU 701 reads a control program stored in a ROM 702 thereby to control the entire operations of the PC 402. A RAM 703 is used as a temporary area such as main memory or work area of the CPU 701. An NVRAM 704 is a nonvolatile memory and stores various items of information therein. A HDD 705 is used as a storage area for storing various items of information such as font data, emulation program, and form data therein. The HDD 705 stores various applications for creating electronic files therein.

One CPU 701 in the PC 402 uses one memory (the RAM 703 or the HDD 705) to perform each processing illustrated in the flowchart described below, but may employ other form. For example, a plurality of CPUs or a plurality of RAMs or HDDs may cooperate to perform each processing illustrated in the flowchart described below.

The operation unit 706 is a keyboard, for example, and the user can input information into the PC 402 via the operation unit 706. A display unit 707 is a cathode-ray tube (CRT) display or liquid crystal display, and displays various items of information thereon.

A wired communication unit 708 is connected with a LAN cable (not illustrated) thereby to communicate with an external device on a network. A wireless communication unit 709 can make wireless communication with an external device on a network via the access point 403.

In the present exemplary embodiment, the HDD 705 of the PC 402 stores a printer driver therein. The printer driver is software used to transmit a print job to the printing apparatus, and the user can print a desired electronic file by use of the printer driver.

Figure 8A:
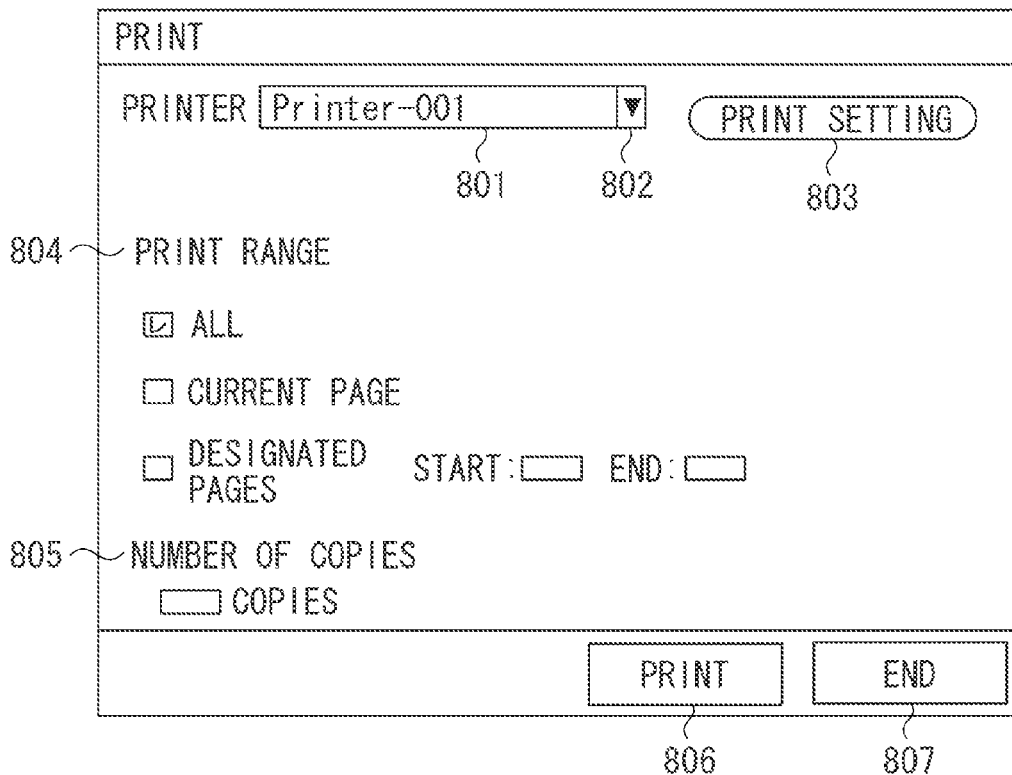
FIGS. 8A and 8B are diagrams illustrating a print screen.

When the user instructs to print an electronic file, the display unit 707 displays a print screen 800 of FIG. 8A by an application corresponding to the electronic file. The print screen 800 is directed for transmitting a print job to the printing apparatus 401, and the display unit 707 displays the print screen 800 as an initial screen thereon. A printing apparatus as a transmission destination of a print job is indicated in field 801. When the CPU 701 displays the print screen 800 as an initial screen, a predefined printing apparatus previously set by the user is displayed in field 801.

Figure 8B:
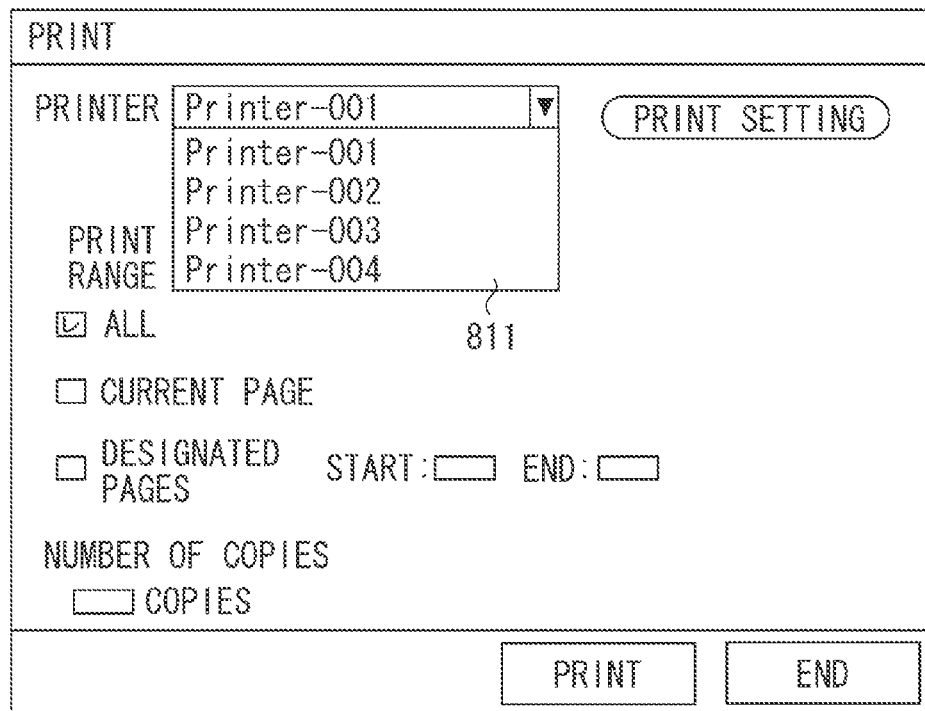

When the user wants to change the printing apparatus as a transmission destination of a print job, the user may select arrow 802. When the user selects arrow 802, a print screen 810 of FIG. 8B is displayed. The user can select a desired printing apparatus from drop-down menu 811 on the print screen 810.

When the user performs print setting such as two-sided printing, aggregate printing, or stapling, the user may select button 803. When the user selects button 803, a print setting screen (not illustrated) is displayed, and the user can perform print setting such as two-sided printing, aggregate printing, or stapling. The printer driver provides the print setting screen. Further, the user can set a print range 804 and a number of copies 805.

When the user selects an OK button 806, the PC 402 transmits a print job to the printing apparatus selected in field 801. The printer driver transmits the print job. When the PC 402 completely transmits the print job, the CPU 701 ends the display of the print screen (the print screen 800 or the print screen 810) (closes the print screen). Also when the user selects an end button 807, the CPU 701 ends the display of the print screen.

Since a print job is large-capacity data, if the power saving mode of the wireless LAN is set to be enabled in the printing apparatus as a transmission destination of a print job, a communication delay easily occurs. When a communication delay occurs, the completion of the print processing based on the print job is delayed, and thus user convenience is deteriorated. Some printing apparatuses end due to an error when the printing apparatuses do not completely receive data for a predetermined time. Therefore, if the power saving mode is enabled in the printing apparatus, a communication delay easily occurs, and additionally a print job may fail to be transmitted. To solve the issue, the present exemplary embodiment is characterized in that the PC 402 transmits a disable command of disabling the power saving mode of the wireless LAN to a printing apparatus (such as the printing apparatus 401) as a transmission destination of a print job. The processing therefor will be described with reference to the flowcharts of FIGS. 9 and 10.

Figure 9:
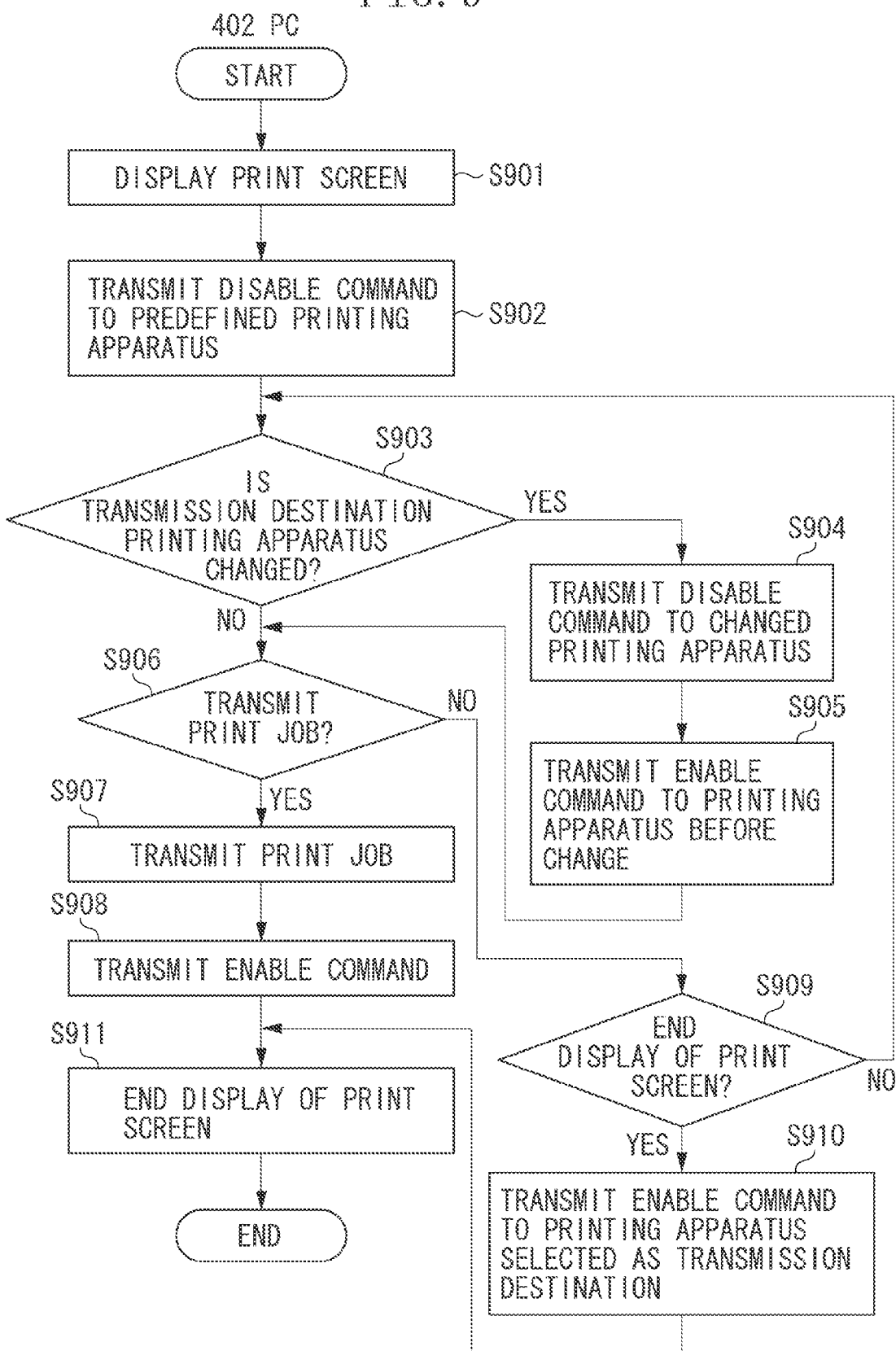
FIG. 9 is a flowchart illustrating processing performed when a print screen is displayed according to the first exemplary embodiment.

The flowchart of FIG. 9 illustrates the processing performed when the CPU 701 displays the print screen in the PC 402. The CPU 701 of the PC 402 develops and executes a program stored in a memory such as the ROM 702 into the RAM 703 thereby to perform each step illustrated in the flowchart of FIG. 9.

When the user instructs to print an electronic file, in step S901, the display unit 707 displays the print screen 800 of FIG. 8A thereon.

When the print screen 800 is displayed, in step S702, the wireless communication unit 709 of the PC 402 transmits a disable command to the predefined printing apparatus previously set by the user. In the present exemplary embodiment, the PC 402 transmits the disable command to the predefined printing apparatus (such as the printing apparatus 401) via the access point 403.

The disable command is directed for disabling the power saving mode of the wireless LAN of the printing apparatus. The printing apparatus which receives the disable command changes the power saving mode of the wireless LAN from enabled to disabled, thereby preventing a communication delay which easily occurs in the enabled power saving mode. The operations of the printing apparatus which receives a disable command will be described below in detail with reference to FIG. 10.

In step S903, the CPU 701 determines whether the printing apparatus as a transmission destination of a print job is changed. According to the present exemplary embodiment, when the user uses drop-down menu 811 in FIG. 8B to change the printing apparatus as a transmission destination, the CPU 701 determines that the printing apparatus as a transmission destination of a print job is changed (YES in step S903), and the processing proceeds to step S904. On the other hand, when the user does not change the printing apparatus as a transmission destination, the CPU 701 determines that the printing apparatus as a transmission destination of a print job is not changed (NO in step S903), and the processing proceeds to step S906.

When the user changes the printing apparatus as a transmission destination of a print job, in step S904, the wireless communication unit 709 of the PC 402 transmits a disable command to a changed printing apparatus. In step S905, the wireless communication unit 709 transmits an enable command to the printing apparatus before change.

The enable command is directed for enabling the power saving mode of the wireless LAN of the printing apparatus. The printing apparatus which receives the enable command changes the power saving mode of the wireless LAN from disabled to enabled. The operations of the printing apparatus which receives an enable command will be described below in detail with reference to FIG. 10.

There has been described that steps S904 and S905 are performed in the order indicated in the flowchart of FIG. 9 in the present exemplary embodiment, but steps S904 and S905 may be performed in the reverse order. Further, steps S904 and S905 may be performed at the same time.

Step S906 will be described below. In step S906, the CPU 701 determines whether to transmit a print job. In the present exemplary embodiment, when the user selects the OK button 806 (YES in step S906), the CPU 701 determines to transmit a print job, and the processing proceeds to step S907. On the other hand, when the user does not select the OK button 806 (NO in step S906), the CPU 701 determines not to transmit a print job, and the processing proceeds to step S909.

In step S907, the wireless communication unit 709 transmits a print job to a printing apparatus (such as the printing apparatus 401) selected in field 801 of FIG. 8A. When the user does not change the printing apparatus as a transmission destination of a print job, the PC 402 transmits a print job to the predefined printing apparatus. On the other hand, when the user uses drop-down menu 811 of FIG. 8B to change the printing apparatus as a transmission destination of a print job, the PC 402 transmits a print job to a changed printing apparatus.

When the PC 402 completely transmits the print job, in step S908, the wireless communication unit 709 transmits an enable command to the printing apparatus (such as the printing apparatus 401) as a transmission destination of the print job. In step S911, the CPU 701 ends the display of the print screen (closes the print screen).

Step S909 will be described below. In step S909, the CPU 701 determines whether to end the display of the print screen. In the present exemplary embodiment, when the user selects the end button 807, or when the user inputs an instruction to end the display of the print screen, the CPU 701 determines to end the display of the print screen (YES in step S909), and the processing proceeds to step S910. On the other hand, when the user does not select the end button 807, the CPU 701 determines not to end the display of the print screen (NO in step S909), and the processing returns to step S903.

In step S910, the wireless communication unit 709 transmits an enable command to the printing apparatus selected as a transmission destination of a print job, or the printing apparatus selected in field 801 of FIG. 8A. In step S911, the CPU 701 ends the display of the print screen being activated.

In the flowchart of FIG. 9, in steps S902 and S904, the PC 402 transmits a disable command of disabling the power saving mode of the wireless LAN to the printing apparatus (such as the printing apparatus 401) as a transmission destination of a print job. Thereby, a communication delay which easily occurs when the power saving mode is enabled in the printing apparatus can be prevented.

In steps S905, S908, and S910, the PC 402 transmits an enable command to the printing apparatus as a transmission destination of the disable command after transmitting the disable command. Thereby, the power saving mode in the printing apparatus can be temporarily changed to be disabled, thereby reducing power consumption in the wireless communication unit of the printing apparatus.

Before being instructed to transmit a print job from the user, in steps S902 and S904, the PC 402 previously transmits a disable command to the printing apparatus in response to the display of the print screen 800, for example. Thereby, for example, even if it takes a much time to perform processing for changing the power saving mode of the printing apparatus from enabled to disabled, the possibility that the power saving mode of the printing apparatus is disabled can be enhanced when the PC 402 actually transmits a print job.

The processing performed when the wireless communication unit 560 of the printing apparatus 401 receives data (such as disable command, enable command, or print job) transmitted from the PC 402 via the access point 403 will be described below using the flowchart of FIG. 10. The CPU 501 develops and executes a program stored in a memory such as the ROM 502 into the RAM 503 thereby to perform each step illustrated in the flowchart of FIG. 10. It is assumed that the user previously sets the printing apparatus 401 as to whether to enable or disable the power saving mode on the power saving mode setting screen 600 of FIG. 6. The NVRAM 504 of the printing apparatus 401 stores the setting therein.

When the printing apparatus 401 receives data transmitted from the PC 402 via the access point 403, in step S1001, the CPU 501 determines whether the received data is a disable command. The CPU 501 determines that the received data is a disable command (YES in step S1001), and then proceeds to step S1002. On the other hand, the CPU 501 determines that the received data is not a disable command (NO in step S1001), and then the processing proceeds to step S1004.

When the received data is a disable command, in step S1002, the CPU 501 determines whether the user sets the "power saving mode enabled." If the user selects the ON button 601 on the power saving mode setting screen 600 of FIG. 6, the CPU 501 determines that the user sets the "power saving mode enabled" (YES in step S1002), and then the processing proceeds to step S1003. In step S1003, the CPU 501 disables the power saving mode. In step S1003, when the CPU 501 disables the power saving mode, the wireless communication unit 560 notifies, to the access point 403, that the CPU 501 disables the power saving mode. On the other hand, if the user selects the OFF button 602 on the power saving mode setting screen 600 of FIG. 6, the CPU 501 determines that the user does not set the "power saving mode enabled" (NO in step S1002), and the processing ends as illustrated in the flowchart of FIG. 10.

Step S1004 will be described below. In step S1004, the CPU 501 determines whether the received data is an enable command. The CPU 501 determines that the received data is an enable command (YES in step S1004), and then the processing proceeds to step S1005. On the other hand, the CPU 501 determines that the received data is not an enable command (NO in step S1004), and then the processing proceeds to step S1007.

When the received data is an enable command, in step S1005, the CPU 501 determines whether the user sets the "power saving mode enabled." If the user selects the ON button 601 on the power saving mode setting screen 600 of FIG. 6, the CPU 501 determines that the user sets the "power saving mode enabled" (YES in step S1005), and then the processing proceeds to step S1006. In step S1006, the CPU 501 enables the power saving mode. In step S1006, when the CPU 501 enables the power saving mode, the wireless communication unit 560 notifies, to the access point 403, that the CPU 501 enables the power saving mode. On the other hand, if the user selects the OFF button 602 on the power saving mode setting screen 600 of FIG. 6, the CPU 501 determines that the user does not set the "power saving mode enabled" (NO in step S1005), and then the processing ends as illustrated in the flowchart of FIG. 10. At this time, the printing apparatus 401 receives the enable command from the PC 402 but the user sets the "power saving mode disabled", and thus the processing ends as illustrated in the flowchart of FIG. 10 without enabling the power saving mode.

Step S1007 will be described below. In step S1007, the CPU 501 determines whether the received data is a print job. The CPU 501 determines that the received data is a print job (YES in step 1007), and then the processing proceeds to step S1009, where the printer 530 performs printing based on the received print job.

On the other hand, the CPU 501 determines that the received data is not a print job (NO in step S1007), and then the processing proceeds to step S1008. In step S1008, the CPU 501 performs processing according to the received command (such as a return to a status request).

In the flowchart of FIG. 10, when the user sets the "power saving mode enabled", the printing apparatus 401 can temporarily disable the power saving mode based on the disable command and the enable command received from the PC 402. This will be described in detail with reference to FIG. 11. FIG. 11 illustrates the processing performed when the user enables the power saving mode of the wireless communication unit 560 of the printing apparatus 401.

Figure 1:
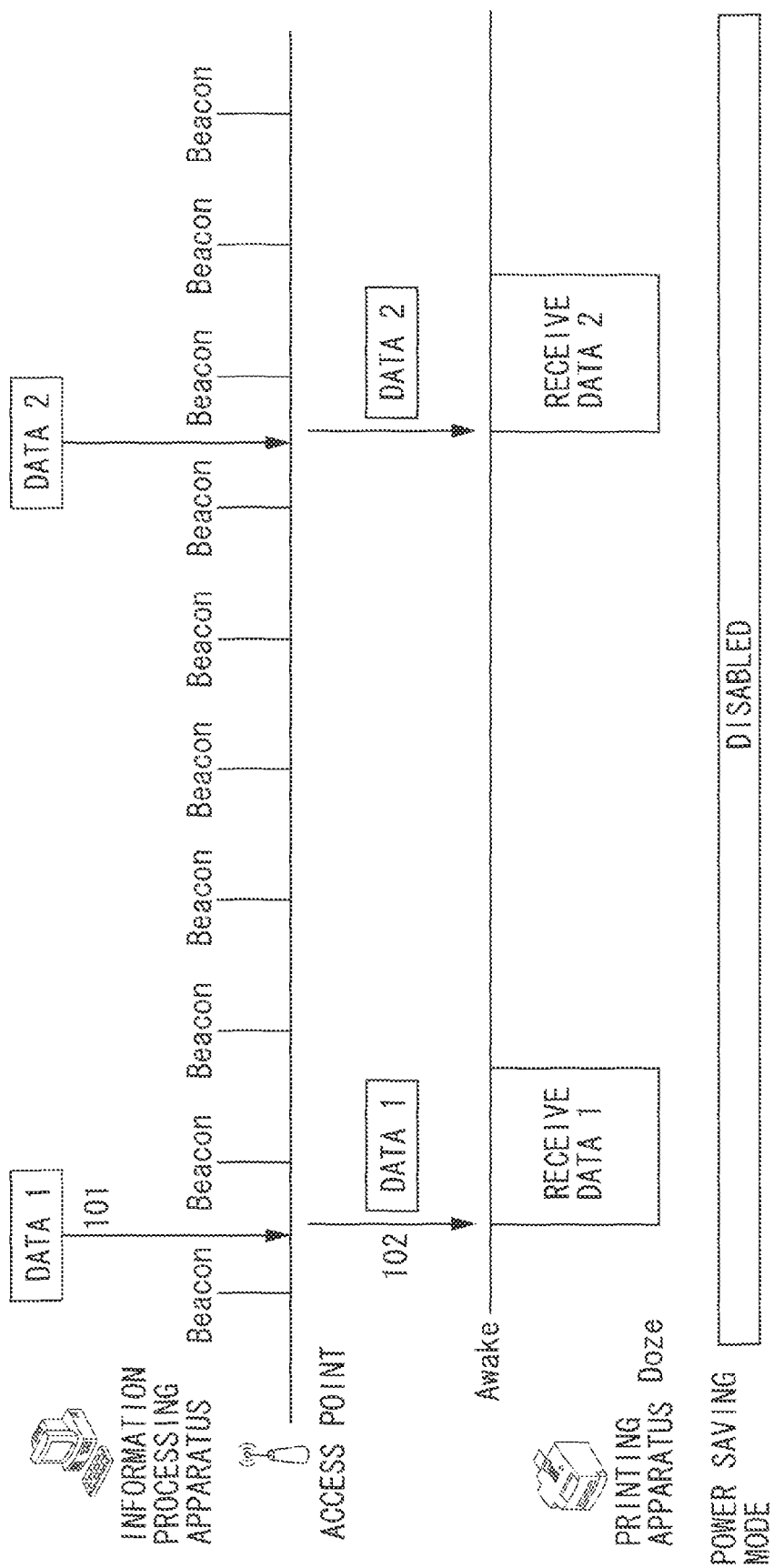
FIG. 1 is a diagram illustrating processing performed when a power saving mode is disabled in the related art.
Figure 2:
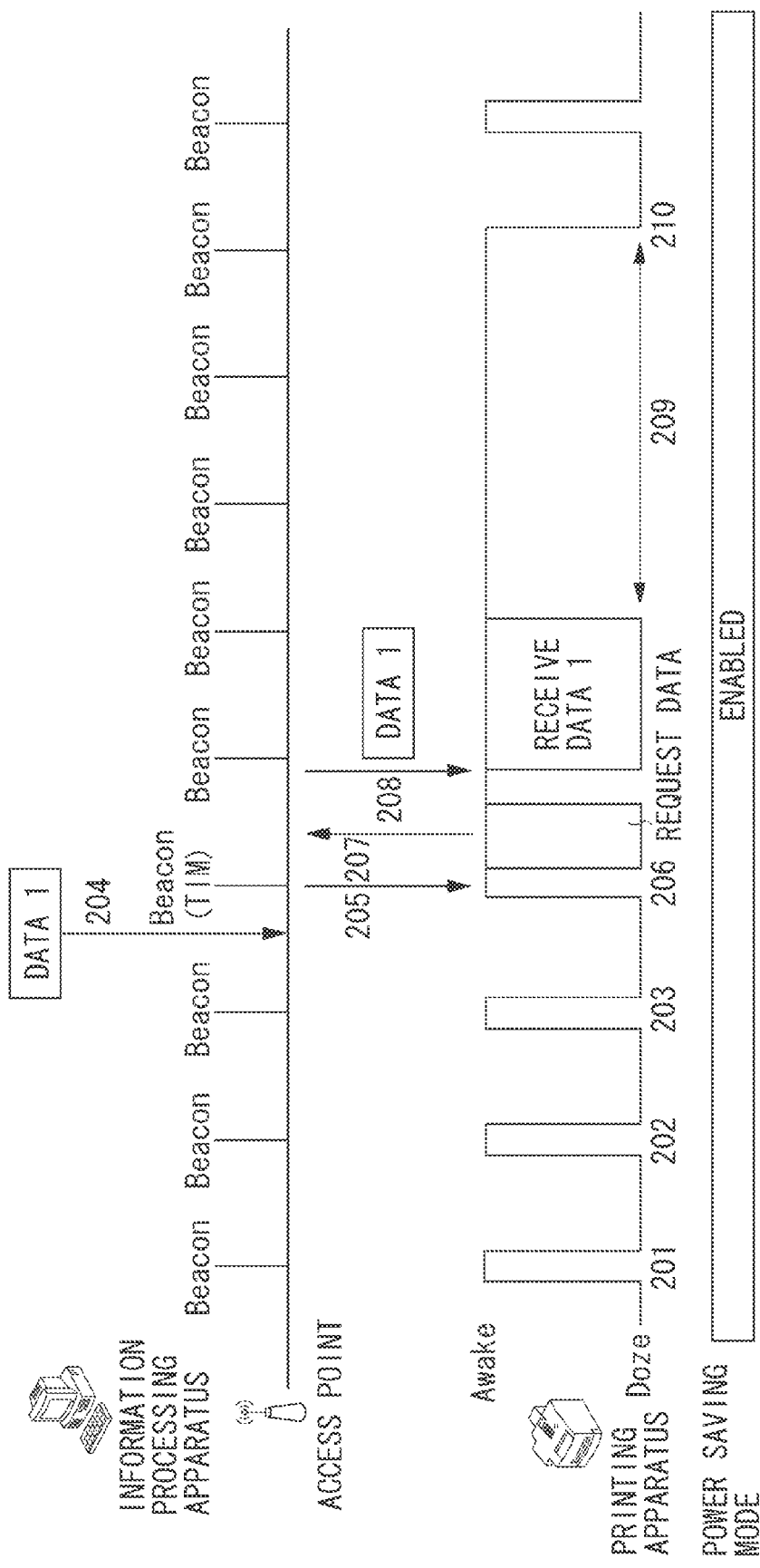
FIG. 2 is a diagram illustrating processing performed when the power saving mode is enabled in the related art.
Figure 3:
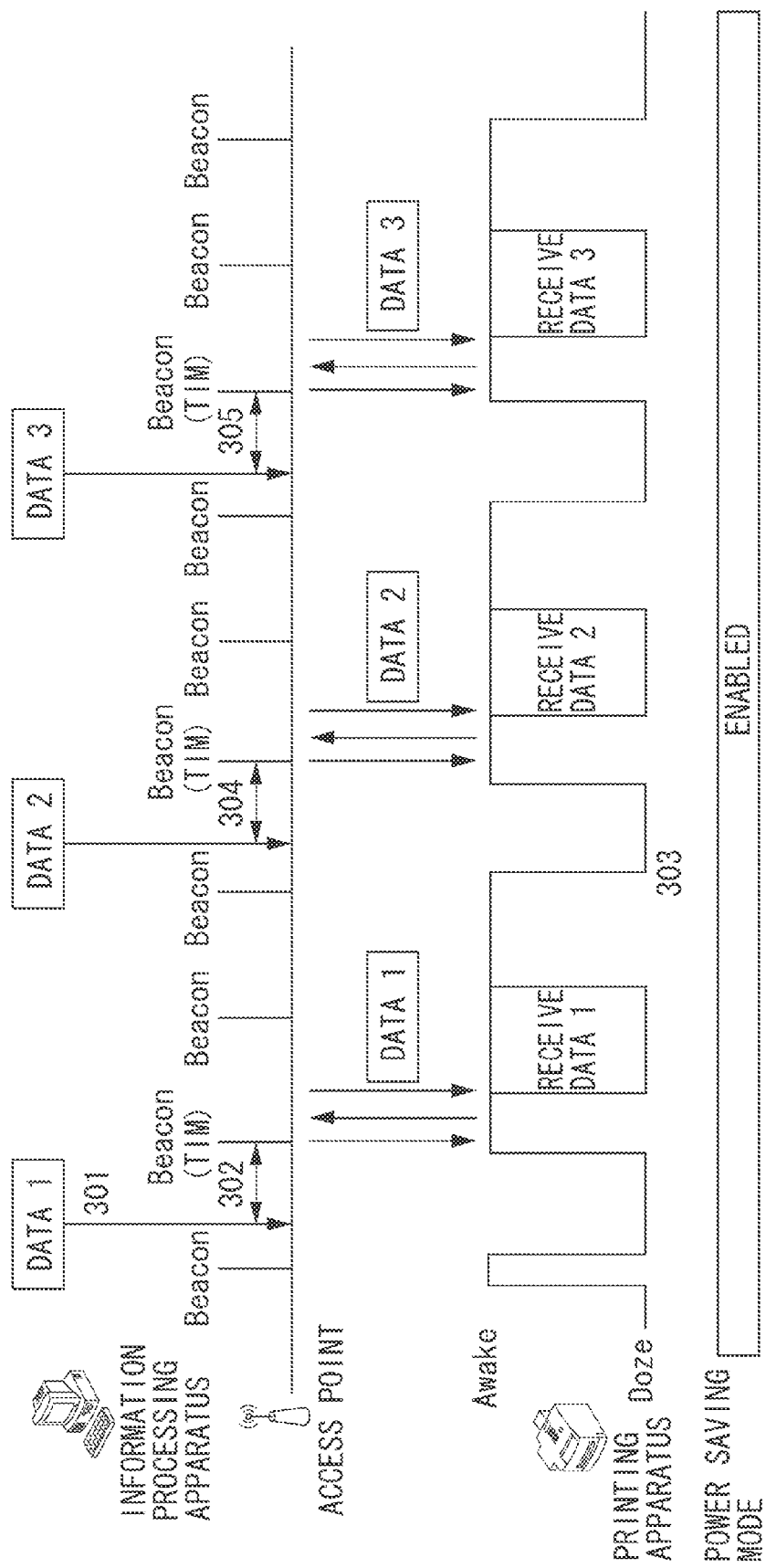
FIG. 3 is a diagram for describing an occurrence of a communication delay.

When the print screen (the print screen 800 or the print screen 810) is displayed on the PC 402, the PC 402 transmits a disable command to the access point 403 (1101). The transmission from the access point 403 to the printing apparatus 401 is performed at a next beacon timing (1102). The printing apparatus 401 which receives the disable command transmitted from the PC 402 changes the power saving mode from enabled to disabled at timing 1103. The change is kept until the printing apparatus 401 receives an enable command. Therefore, when the access point 403 receives a print job transmitted from the PC 402 (which is divided into data 1, data 2, and data 3 in FIG. 11), the communication delays indicated by time 302, time 304, and time 305 described in FIG. 3 can be prevented from occurring.

When the display of the print screen ends in the PC 402, the PC 402 transmits an enable command (1104). The printing apparatus 401 which receives the enable command transmitted from the PC 402 via the access point 403 returns the power saving mode from disabled to enabled at timing 1105.

As described above, in the present exemplary embodiment, the PC 402 transmits a disable command of disabling the power saving mode of the wireless LAN to the printing apparatus (such as the printing apparatus 401) as a transmission destination of a print job. Thereby, a communication delay which easily occurs when the power saving mode is enabled in the printing apparatus can be prevented.

The PC 402 transmits an enable command to the printing apparatus as a transmission destination of the disable command after transmitting the disable command. Thereby, the power saving mode in the printing apparatus can be temporarily changed to be disabled, thereby reducing power consumption in the wireless communication unit of the printing apparatus.

In the first exemplary embodiment, when the CPU 701 displays the print screen or when the user changes the printing apparatus as a transmission destination of a print job, the PC 402 transmits a disable command of disabling the power saving mode to the printing apparatus. A second exemplary embodiment is characterized by transmitting a return-from-sleep command of bringing the printing apparatus from a sleep mode to a normal mode to the printing apparatus in addition to a disable command.

The power modes provided in the printing apparatus 401 will be described first. The printing apparatus 401 has at least two power modes of the normal power mode and the sleep mode. When the printing apparatus 401 is in the normal power mode, the power control unit 511 of the printing apparatus 401 performs control to supply power from a power supply (not illustrated) to the control unit 500, the operation unit 520, the printer 530, the scanner 540, the wired communication unit 550, and the wireless communication unit 560.

When the printing apparatus 401 meets a predetermined condition, the printing apparatus 401 transitions from the normal power mode to the sleep mode. The predetermined condition is that a job does not occur in the printing apparatus 401 for a predetermined time (10 minutes, for example), for example. When the printing apparatus 401 is in the sleep mode, the power control unit 511 performs control to supply power from the power supply (not illustrated) to the control unit 500, the wired communication unit 550, and the wireless communication unit 560. Then, the power control unit 511 performs control to stop supplying power to the operation nit 520, the printer 530, and the scanner 540. Since the power control unit 511 stops supplying power to the operation unit 520, the printer 530, and the scanner 540, power consumption can be further reduced when the printing apparatus 401 is in the sleep mode than when the printing apparatus 401 is in the normal power mode.

When the printing apparatus 401 is in the sleep mode, the printing apparatus 401 transitions to the normal power mode on receiving a print job. At this time, a time is required to check the amount of remaining toner or to adjust the printer engine until the printer 530 enters the printable state. That is, when the printing apparatus 401 transitions to the normal power mode on receiving a print job, the printing apparatus 401 cannot immediately perform printing based on the received print job. Thus, in the present exemplary embodiment, the PC 402 transmits, to the printing apparatus 401, a return-from-sleep command of bringing the printing apparatus 401 from the sleep mode to the normal power mode in addition to a disable command of disabling the power saving mode.

The flowchart of FIG. 12 illustrates the processing performed when the CPU 701 displays the print screen in the PC 402. The CPU 701 of the PC 402 develops and executes a program stored in a memory such as the ROM 702 into the RAM 703 thereby to process each step illustrated in the flowchart of FIG. 12. Steps with the same reference numerals as in FIG. 9 among steps in the flowchart of FIG. 12 are the same processing as those in the flowchart of FIG. 9, and thus a description thereof will be omitted.

When the CPU 701 displays the print screen in step S901, in step S1201, the wireless communication unit 709 transmits a return-from-sleep command to the predefined printing apparatus via the access point 403. The order of steps S902 and S1201 is not limited to the order illustrated in FIG. 12, and may be reverse. Further, steps S902 and S1201 may be performed at the same time.

When the user changes the printing apparatus as a transmission destination in step S903, in step S1202, the wireless communication unit 709 transmits a return-from-sleep command to a changed printing apparatus via the access point 403. The order of steps S904, S1202, and S905 is not limited to the order illustrated in FIG. 12, and the order illustrated in FIG. 12 may be changed. Steps S904, S1202, and S905 may be performed at the same time.

The operations of the printing apparatus 401 according to the present exemplary embodiment are similar to those in the flowchart illustrated in FIG. 10. That is, in step S1008 in FIG. 10, the printing apparatus 401 transitions from the sleep mode to the normal power mode based on the received return-from-sleep command. When the printing apparatus 401 is in the normal power mode when receiving the return-from-sleep command, the printing apparatus 401 discards the received return-from-sleep command.

As described above, in the present exemplary embodiment, the PC 402 transmits a return-from-sleep command in addition to a disable command to the printing apparatus (such as the printing apparatus 401) as a transmission destination of a print job before transmitting a print job. Thereby, while a communication delay which easily occurs when the power saving mode is enabled in the printing apparatus can be prevented, the printing apparatus can immediately perform printing based on a print job when receiving the print job.

According to the first exemplary embodiment and the second exemplary embodiment, in step S1006 in FIG. 10, when receiving an enable command transmitted from the PC 402, the printing apparatus 401 enables the power saving mode under a condition that the user sets the "power saving mode enabled." When a plurality of PCs uses the printing apparatus 401, if the printing apparatus 401 enables the power saving mode based on an enable command received from a first PC, the printing apparatus 401 can receive a print job from a second PC different from the first PC after enabling the power saving mode. In this case, a communication delay can occur when the printing apparatus 401 receives a print job from the second PC. In terms of this point, when receiving an enable command transmitted from a PC, the printing apparatus 401 according to a third exemplary embodiment confirms that a print job cannot be transmitted from other PC, and then enables the power saving mode.

The flowchart illustrated in FIG. 13 indicates the processing performed when the wireless communication unit 560 of the printing apparatus 401 receives data (such as disable command, enable command, or print job) transmitted from the PC 402 via the access point 403. The CPU 501 develops and executes a program stored in a memory such as the ROM 502 into the RAM 503 thereby to process each step illustrated in the flowchart of FIG. 13. Steps with the same reference numerals as in FIG. 10 among steps in the flowchart of FIG. 13 are the same processing as those in the flowchart of FIG. 10, and thus a description thereof will be omitted.

When the printing apparatus 401 receives a disable command and the CPU 501 determines that the user sets the "power saving mode enabled", the processing proceeds to step S1301. In step S1301, the CPU 501 adds 1 to the value of a variable Count. Then, in step S1003, the printing apparatus 401 disables the power saving mode.

The variable Count is stored in the NVRAM 504, and its initial value is 0. The variable Count indicates the number of PCs which displays a print screen with the printing apparatus 401 as a transmission destination of a print job, or the number of PCs which are likely to transmit a print job to the printing apparatus 401. For example, if three PCs display a print screen with the printing apparatus 401 as a transmission destination of a print job at the same time, the printing apparatus 401 receives a disable command three times, and thus the value of the variable Count is 3.

When the printing apparatus 401 receives an enable command and the CPU 501 determines that the user sets the "power saving mode enabled", the processing proceeds to step S1302. In step S1302, the CPU 501 decrements the value of the variable Count by 1. Then, in step S1303, the CPU 501 determines whether the value of the variable Count is 0. When the value of the variable Count is 0, the processing proceeds to step S1006 and the CPU 501 enables the power saving mode. On the other hand, when the value of the variable Count is not 0, the CPU 501 does not enable the power saving mode, and the processing ends as illustrated in the flowchart of FIG. 13 while maintaining the power saving mode disabled.

The case where the CPU 501 determines that the value of the variable Count is not 0 means that the display of the print screen in a PC ends when three PCs display a print screen with the printing apparatus 401 as a transmission destination of a print job at the same time, for example. At this time, the value of the variable Count is 2, and other PCs are likely to transmit a print job, and thus the processing ends as illustrated in the flowchart of FIG. 13 without performing step S1006.

As described above, in the present exemplary embodiment, when the printing apparatus 401 receives an enable command and the user sets the "power saving mode enabled", if the value of the variable Count is not 0, the CPU 501 does not enable the power saving mode. On the other hand, if the value of the variable Count is 0, the CPU 501 enables the power saving mode. Thereby, the printing apparatus 401 confirms that other PC cannot transmit a print job, and then can enable the power saving mode.

In the first to third exemplary embodiments, a mode has been described in which when the CPU 701 displays the print screen in the PC 402 or when the user changes the printing apparatus as a transmission destination of a print job, the PC 402 transmits a disable command of disabling the power saving mode of the wireless LAN to the printing apparatus 401. However, the present invention is not limited to the print screen or print job. When the CPU 701 displays a specific screen for transmitting data to the printing apparatus in the PC 402 or when the user changes a transmission destination of data, not limited to the print screen, the PC 402 may transmit a disable command to the printing apparatus.

Specifically, when the PC 402 transmits image data to the printing apparatus 401 and displays thereon an image data management screen for accumulating the transmitted image data in the printing apparatus 401, the PC 402 may transmit a disable command to the printing apparatus 401.

A data transmission apparatus for transmitting data and a data reception device for receiving transmitted data are not limited to the PC 402 and the printing apparatus 401, respectively. For example, when a moving image distribution screen for transmitting moving image data from a first communication terminal to a second communication terminal is displayed on the first communication terminal, the first communication terminal may transmit a disable command to the second communication terminal.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-260530 filed Nov. 29, 2012, which is hereby incorporated by reference herein in its entirety.

What is claimed is:

1. An information processing apparatus for transmitting data to an external apparatus with which the information processing apparatus is capable of performing wireless communication, the information processing apparatus comprising:
   a displaying unit;
   a first transmission unit configured to transmit to the external apparatus, when the displaying unit displays a specific screen, a disable command for disabling a power saving mode in which a state of the external apparatus transits between an Awake state and a Doze state in synchronization with a beacon of an access point; and
   a second transmission unit configured to transmit, when a user inputs a transmission instruction of data after the first transmission unit has transmitted the disable command to the external apparatus, the data to the external apparatus.

2. The information processing apparatus according to claim 1, wherein, when the second transmission unit completely transmits the data, the first transmission unit transmits, to the external apparatus, an enable command for enabling the power saving mode.

3. The information processing apparatus according to claim 1, wherein, when the user inputs an instruction of ending the display of the specific screen, the first transmission unit transmits, to the external apparatus, an enable command for enabling the power saving mode.

4. The information processing apparatus according to claim 1, further comprising a change unit configured to change a data transmission destination,
   wherein, when the user changes a data transmission destination by the change unit, the first transmission unit transmits the disable command to a changed data transmission destination.

5. The information processing apparatus according to claim 4, wherein, when the user changes a data transmission destination by the change unit, the first transmission unit transmits an enable command for enabling the power saving mode to a data transmission destination before change.

6. The information processing apparatus according to claim 1,
   wherein the data transmitted by the second transmission unit is a print job, and
   wherein the specific screen is a print screen.

7. The information processing apparatus according to claim 6, wherein the external apparatus is a printing apparatus set as a predefined printing apparatus in the print screen.

8. The information processing apparatus according to claim 1, wherein the specific screen is a data transmission screen for transmitting data to the external apparatus.

9. A method for an information processing apparatus having a displaying unit, wherein the information processing apparatus for transmitting data to an external apparatus with which the information processing apparatus is capable of performing wireless communication, the method comprising:
   transmitting to the external apparatus, when the displaying unit displays a specific screen, a disable command for disabling a power saving mode in which a state of the external apparatus transits between an Awake state and a Doze state in synchronization with a beacon of an access point; and transmitting, when a user inputs a transmission instruction of data after the disable command has been transmitted to the external apparatus, the data to the external apparatus.

10. A non-transitory computer-readable storage medium storing a program causing a computer to perform the method according to claim 9.

* * * * *